Inventor:
Werner Schwarz
BY Spencer & Kaye
Attorneys

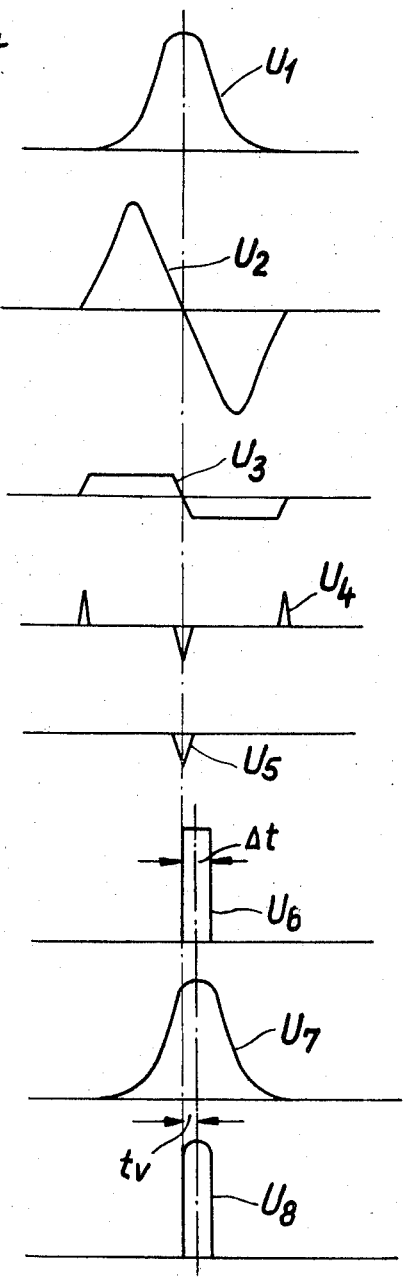

United States Patent Office 3,430,192
Patented Feb. 25, 1969

3,430,192
METHOD AND APPARATUS FOR INCREASING THE ANGULAR DEFINITION OF THE DIRECTION INDICATION IN SONAR SYSTEMS
Werner Schwarz, Bremen-Oberneuland, Germany, assignor to Beteiligungs- und Patentverwaltung G.m.b.H., Essen, Germany
Filed Nov. 13, 1967, Ser. No. 681,985
Claims priority, application Germany, Nov. 10, 1966, B 89,761
U.S. Cl. 340—3
Int. Cl. G01s 9/66
8 Claims

ABSTRACT OF THE DISCLOSURE

A method and apparatus for increasing the angular definition of the direction indication in sonar systems having a receiver which continuously scans the region to be monitored and which produces, in response to each received echo, a scanning pulse having a peak at a scanning angle corresponding precisely to the direction of origin of echo, the angular definitition of the directional indication being increased by passing only a limited portion of each scanning pulse to the associated indicating device, which limited portion coincides substantially with the scanning pulse peak.

Background of the invention

The present invention relates to a method and apparatus to increase the angular reproduction sharpness, or definition, of the direction indication in sonar systems in which a plurality of fixed receivers with overlapping directional characteristics are scanned in succession or wherein a single receiver is continuously rotated or oscillated.

The known methods of this type have the disadvantage that the angular sharpness of the reproduction substantially depends on the total width of the directional characteristic at the actuating threshold. If this width is 7.5°, for example, all reflecting objects within the entire distance range are reproduced with an indication that extends over at least 7.5°. Thus a considerable ambiguity exists in the directional indication which is particularly unfavorable when several objects which are located in close proximity to each other are to be detected.

When devices having directional characteristics of narrower width are used a sharper image can be achieved. Such a narrowed directional characteristic, however, is accompanied by increased expenditures and requirements for space for the receiver system, particularly when several separate receiving channels with angularly offset, overlapping directional characteristics are used in the receiver system.

Summary of the invention

It is a primary object of the present invention to overcome these drawbacks and difficulties.

Another object of the present invention is to substantially reduce the angular extent of each echo indication.

Yet another object of the present invention is to limit the portion of each scanning pulse produced in response to a received echo which is transmitted to the associated indicating device.

Still another object of the present invention is to narrow the angular extent of each echo indication without requiring a reduction in the directional characteristic of the associated receiving device, or devices.

These and other objects according to the present invention are achieved by a method for increasing the angular definition of the directional indication in a sonar system having a receiver which continuously scans the region to be monitored and which produces, in response to each received echo, a scanning pulse having a peak at a scanning angle corresponding precisely to the direction of origin of the echo. The method according to the present invention involves the steps of gating each scanning pulse from the receiver output to an indicating device during the angular scanning process at the moment when the peak of the scanning pulse appears at the receiver output, the gating periods being adjustable and being shorter than the corresponding scanning pulse periods, and delaying each scanning pulse by one-half its associated gating period for causing the portion of each scanning pulse which passes to the indicating device to be centered about the scanning pulse peak.

The objects according to the present invention are also achieved in a sonar system having a receiver which angularly scans the region to be monitored in a continuous manner and which produces, in response to each received echo, a scanning pulse having a peak at a scanning angle corresponding precisely to the direction of origin of the echo, the sonar system further including an indicating device for providing an indication of at least the direction of origin of each received echo, by the improvement composed of means for increasing the angular definition of the directional indication of each received echo. The means according to the present invention essentially include gating means for gating each scanning pulse from the receiver output to the indicating device during the angular scanning process at the moment when the peak of the scanning pulse appears at the receiver output, the gating periods being adjustable and being shorter than the corresponding scanning pulse periods, and delay means connected between the receiver output and the gating means for delaying each scanning pulse by one-half its associated gating period for causing the portion of each scanning pulse which passes through the indicating device to be centered about the scanning pulse peak. It thus results that, without raising the actuating threshold and thus without adversely affecting the sensitivity and range of the system, only a more or less narrow angular section, which coincides with the maximum value of the scanning pulse, is delivered to the indicating device so that a more distinct and narrower image appears.

The method according to the invention is preferably employed in a sonar system in which an amplifier, a first differentiating device, a limiter, a second differentiating device, a rectifier, and a monostable multivibrator are connected in series to the receiving system. At the maximum point of each bell-shaped scanning pulse the first differentiating stage and the subsequent limiter generate a zero voltage passage which is converted into a peak voltage by the second differentiating stage and by the rectifier to actuate the monostable multivibrator. The multivibrator opens a gate for a predetermined duration beginning at the moment of maximum passage of the scanning pulse.

A delay line with a delay time of half the duration of the gate opening time is also connected to the receiving system and to the amplifier, the signal input of the gate being connected to the delay line output. The gate thus passes a brightening pulse for indication purposes which is derived from the delayed bell-shaped scanning pulse and which is symmetrical to the maximum value of the scanning pulse.

The duration of the gate opening and the delay period can be made simultaneously adjustable in order to adapt the angular sharpness of the image to the prevailing conditions.

Brief description of the drawings

FIGURE 4 is a pulse diagram to illustrate the operation of the sonar system according to the present invention.

*Description of the preferred embodiments*

Figure 1:
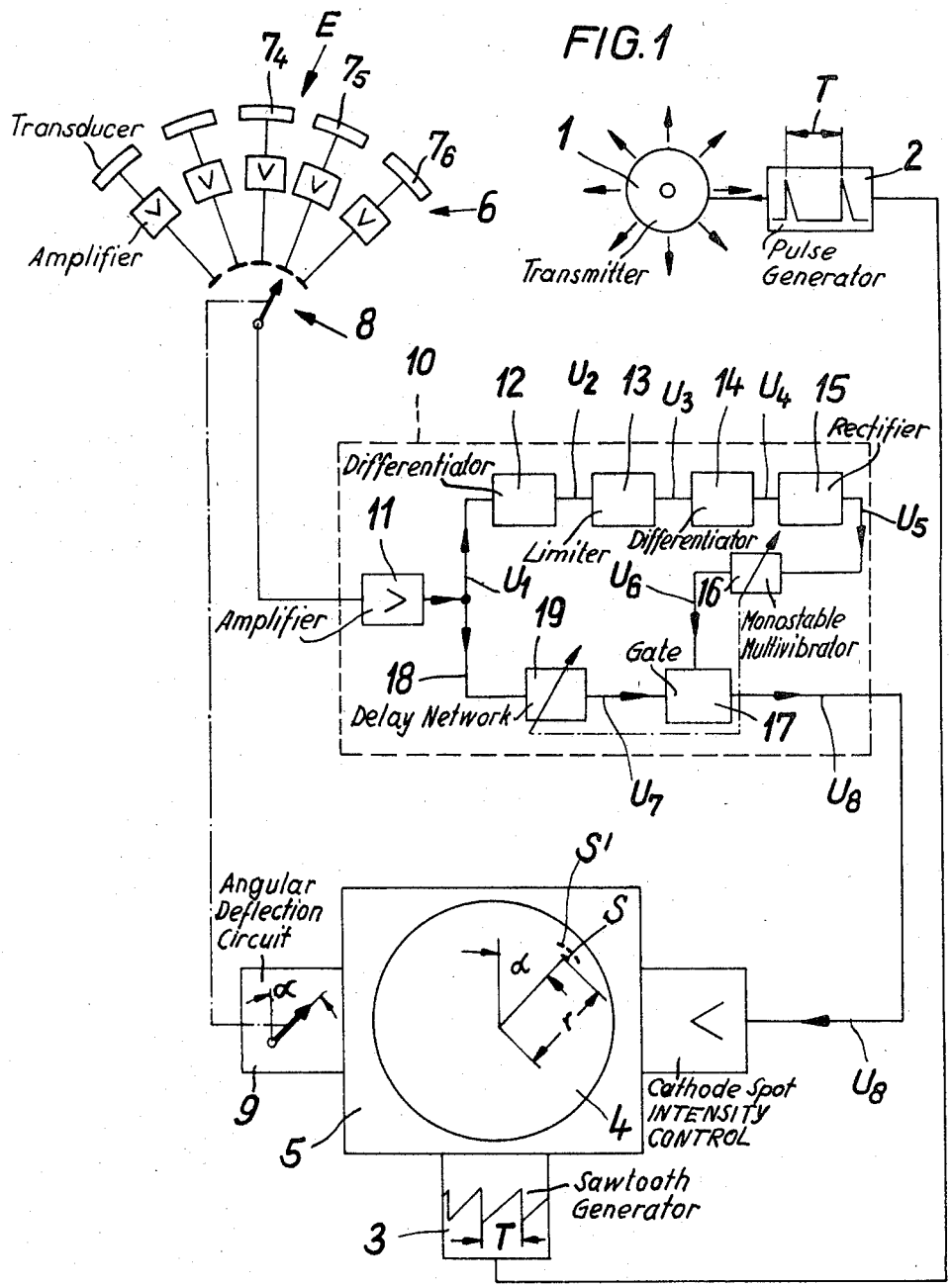
FIGURE 1 is a schematic representation of a sonar system constructed according to the present invention.

The sonar system illustrated in FIGURE 1 serves to determine the direction and distance of the sonar signal reflecting objects and operates with acoustic pulses according to the back reflection system. A transmitter 1 is excited by a pulse generator 2 to emit omnidirectional sound pulses at intervals T, which intervals correspond to the time required for a sonar pulse to travel to a target object at the maximum distance range of the sonar system and to return to the system receiver. Simultaneously with the emission of sound pulses, a sawtooth generator 3 is actuated to produce a train of sawtooth signals having the same period T, the start of each sawtooth wave being synchronized with the emission of a corresponding sonar pulse from transmitter 1. The output of generator 3 is connected to control the radial deflection of a cathode ray spot on the screen 4 of a cathode ray tube 5.

The cathode ray spot is brightened by the echo pulses which are received by a receiver 6 and subsequently amplified to present an echo indication S whose radial distance $r$ from the center of screen 4 corresponds to the range of the reflecting object responsible for the echo.

Figure 2:
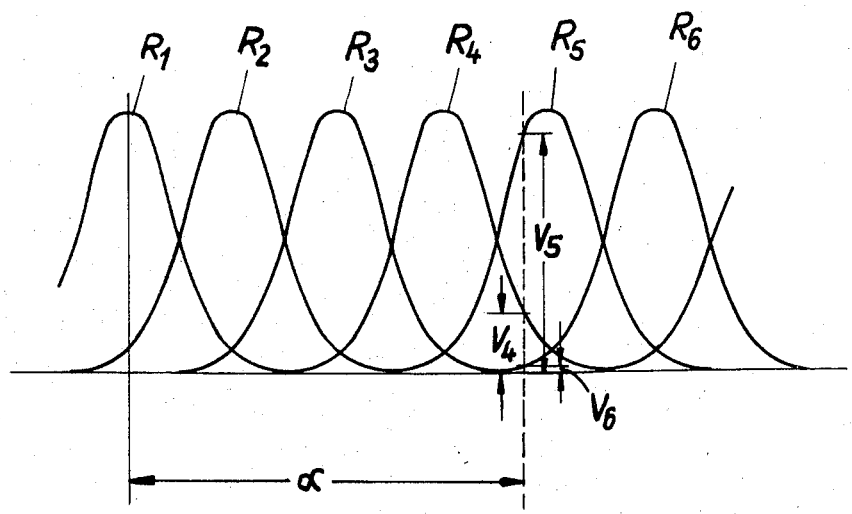
FIGURE 2 is a waveform diagram showing the directional characteristics of the receiving set according to FIGURE 1.

To determine the angular position $\alpha$ of the reflecting object, the receiver is provided with a plurality of, for example, forty-eight receiving transducers 7 uniformly spaced around a horizontal circle and having directional characteristics $R_1$ to $R_{48}$ which overlap each other, as can be seen in FIGURE 2. The transducers are preferably spaced so that the directional characteristics of adjacent transducers intersect at a point where the sensitivity of each transducer is one-half its maximum sensitivity, which maximum sensitivity occurs at the center of its directional characteristic, so that several receiving transducers 7 will be responsive to each echo. If, for example, as shown in FIGURE 2, the echo E arrives from a direction lying at an angle $\alpha=27.5°$ with respect to a reference direction, three receiving detectors $7_4$, $7_5$ and $7_6$ having directional characteristics $R_4$, $R_5$ and $R_6$, respectively, will produce the receiving voltages $V_4$, $V_5$ and $V_6$, respectively.

Each transducer of the circular group $7_1$ to $7_{48}$ is scanned in succession by a uniformly rotating scanning device 8 which rotates at such a high speed that an echo signal received by any transducer will be conducted to the scanning device. In other words, each complete scanning rotation period will be at least of the same order of magnitude as the duration of the output produced by any one transducer in response to an echo pulse.

On the screen 4 of the cathode ray tube 5 each echo is accurately represented, as pertains to its angular direction, by an echo indicating bright spot S due to the fact that the angular component of the spiral deflection of the cathode ray spot, which angular component is generated by the angular deflection circuit 9, is in synchronism with the rotation of scanning device 8. The scanning device 8, which in FIGURE 1 is shown schematically as a mechanical switch having a rotating contact for reasons of simplicity. However, any known mechanical or electronic scanning system can be employed, if it can interpolate between the individual scanning points. The device 9 can be constituted by any known electronic externally controlled angular deflection circuit.

Figure 3:
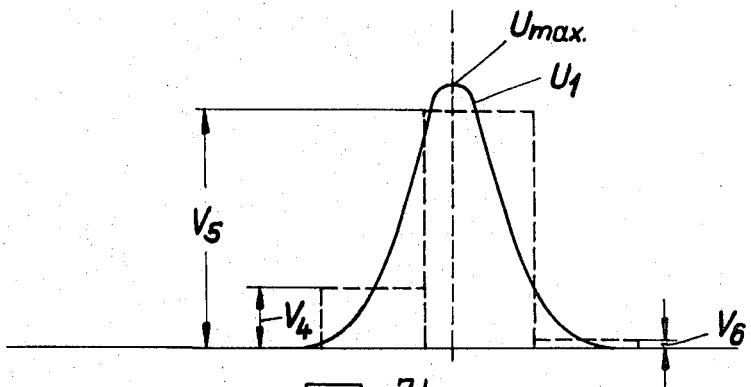
FIGURE 3 is a waveform diagram of the scanning pulse resulting for a certain target direction in the apparatus of FIGURE 1.

With the assumed reflecting object having an annular position $\alpha=27.5°$, the above-described scanning of the transducer outputs results in a scanning pulse $U_1$, at the rotating contact of switch 8, having the bell-shaped form shown in FIGURE 3, because the scanning device interpolates between the receiving voltages $V_4$, $V_5$ and $V_6$. The shape of pulse $U_1$ corresponds to the form of the directional characteristics $R_1$ to $R_{48}$.

The scanning device is rotated continuously at a rapid rotational speed which is preferably sufficiently high to cause each returning echo to produce several scanning pulses $U_1$ having the characteristic bell-shaped form shown in FIGURE 3. The maximum amplitude $U_{max}$ of the pulse $U_1$ occurs at a position which coincides exactly with the target direction of the reflection object $\alpha=27.5°$.

The total width of the scanning pulse $U_1$ might extend over a large angular range, for example, of 15°, if the receivers have a low sensitivity threshold and, if they have a higher threshold, for example, one-half the maximum voltage $U_{max}$, the pulse width will still extend over an angular range of 7.5°, which is equal to the angular offset between the individual directional characteristics $R_1$ to $R_{48}$. Each strong echo therefore, if its receiving voltage were applied, after amplification, directly to the cathode ray tube 5 to brighten the light spot, would produce an arcuate echo indication S'. The indication S' extends over at least an angular range of 7.5° and the true direction of origin of the echo is approximately in the center of this arcuate indication at the point where the maximum $U_{max}$ of the scanning pulse is located.

The circuit 10 of FIGURE 1, which will be described with reference to the waveform diagrams of FIGURE 4, serves to derive a narrow brightening pulse $U_8$ which is limited to a narrow angular portion adjacent the maximum $U_{max}$ of the bell-shaped scanning pulse $U_1$. For this purpose the scanning pulse $U_1$, after being amplified by the amplifier 11, is differentiated in a differentiating stage 12 and the resulting signal $U_2$ is clipped in a limiter 13. The limited signal $U_3$, which has a zero passage at the point corresponding to the maximum $U_{max}$ of the received voltage $U_1$, is differentiated in a further differentiating stage 14. The signal $U_4$ coming from this differentiating stage 14 is fed into a rectifier 15 which only permits the passage of the center, negative, peak of the three voltage peaks of signal $U_4$ generated in the differentiating stage 14. This voltage peak $U_5$ is converted by a monostable multivibrator 16 into a gating pulse $U_6$ having a gate opening duration of $\Delta t$, which pulse is delivered to control the opening of a gate 17.

At the same time, the scanning pulse $U_1$ passes over line 18 via a delay network 19 to the main input of gate 17 in the form of a delayed pulse $U_7$. The delay time $t_v$ of network 19 is adjusted to correspond to one-half the duration $\Delta t$ of the gate opening pulse $U_6$. In this way, only a narrow portion of the delayed pulse $U_7$ is passed by gate 17, this portion being centered about the maximum of the scanning pulse. The resulting narrow brightening pulse $U_8$, which is connected to a cathode spot intensity control to create the light spot on the screen 4 of the cathode ray tube 5, preserves the amplitude information of the scanning pulse $U_1$ and additionally enhances the angular precision information which is presented by the location of the peak of the bell-shaped scanning pulse $U_1$.

Thus, there appears on the screen of the cathode ray tube 5 a short echo indication S which has a small angular extent of, for example, about 2° instead of the arcuate echo indication S' which extends over an angular range of, for example, 7.5°.

The angular width of the echo indication S can be adjusted by selection of the opening time $\Delta t$ of gate 17 and a corresponding adjustment of the delay time $t_v$ of the delay network 19. The receiver system could be constructed so that both of these adjustments are made simultaneously by connecting the adjustment elements of the multivibrator 16 and the delay network 19 together through a suitable linkage, as indicated in broken lines in FIGURE 1.

The time delay $t_v$ of the brightening pulse $U_8$ permitted to pass through gate 17 in relation to the maximum value of the original scanning pulse $U_1$ does not adversely affect the operation of the device since it remains the same for all scanning pulses and the angular deflection produced by circuit 9 can be easily adjusted to compensate for this time delay.

Figure 5:
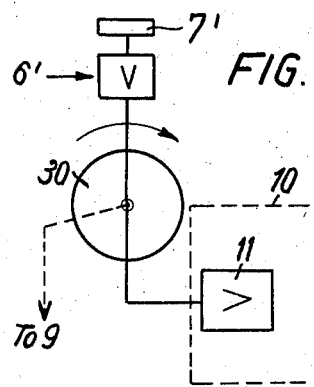
FIGURE 5 is a schematic representation of a modified version of a portion of the system of FIGURE 1.

Several modifications and further embodiments are possible within the scope of the present invention. In particular, it also can be employed for other types of sonar systems in which, for example, a single receiving antenna is continuously rotated. Such an arrangement is shown in FIGURE 5 wherein the single receiver arrangement 6′ is mounted for continuous high speed rotation on support 30.

It will be understood that the above description of the present invention is susceptible to various modifications, changes and adaptations, and the same are intended to be comprehended within the meaning and range of equivalents of the appended claims.

1. A method for increasing the angular definition of the directional indication in a sonar system having a re-receiver which continuously scans the region to be monitored and which produces, in response to each received echo, a scanning pulse having a peak at a scanning angle corresponding precisely to the direction of origin of the echo, comprising the steps of:
   gating each scanning pulse from the receiver output to an indicating device during the angular scanning process at the moment when the peak of the scanning pulse appears at the receiver output, the gating periods being adjustable and being shorter than the corresponding scanning pulse periods; and
   delaying each scanning pulse by one-half its associated gating period for causing the portion of each scanning pulse which passes to the indicating device to be centered about the scanning pulse peak.

2. In a sonar system having a receiver which angularly scans the region to be monitored in a continuous manner and which produces, in response to each received echo, a scanning pulse having a peak at a scanning angle corresponding precisely to the direction of origin of the echo, the system further including an indicating device for providing an indication of at least the direction of origin of each received echo, the improvement wherein means are provided for increasing the angular definition of the directional indication of each received echo, said means comprising in combination:
   gating means for gating each scanning pulse from the receiver output to the indicating device during the angular scanning process at the moment when the peak of the scanning pulse appears at the receiver output, the gating periods being adjustable and being shorter than the corresponding scanning pulse periods; and
   delay means connected between said gating means and said receiver output for delaying each scanning pulse by one-half its associated gating period for causing the portion of each scanning pulse which passes to the indicating device to be centered about the scanning pulse peak.

3. An arrangement as defined in claim 2 further comprising:
   amplifier means connected between said receiver output and the input of said delay means;
   first differentiator means connected to the output of said amplifier means for producing a signal representing the time differential of each scanning pulse;
   amplitude limiter means connected to the output of said first differentiating means for clipping the peaks of each differentiated signal;
   second differentiating means connected to the output of said limiting means for producing pulses of a first polarity at the beginning and end of each clipped signal and a pulse of the opposite polarity at the zero cross-over occurring at that point of such clipped signal which corresponds to the peak of the associated scanning pulse;
   rectifier means connected to the output of said second differentiating means for passing only the opposite polarity pulse corresponding to the zero cross-over of the clipped signal; and
   gate signal producing means connected between said rectifier means and the gating input of said gating means for producing a gating pulse in response to each pulse delivered by said rectifier means.

4. An arrangement as defined in claim 3 wherein the output of said delay means is connected to the signal input of said gating means.

5. An arrangement as defined in claim 4 wherein said gate signal producing means are constituted by a monostable multivibrator.

6. An arrangement as defined in claim 5 wherein said multivibrator and said delay means are linked together for permitting the length of the pulses produced by said multivibrator and the length of the time delay produced by said delay means to be adjusted simultaneously.

7. An arrangement as defined in claim 2 wherein said receiver is composed of a plurality of fixed transducers having overlapping directional characteristics and a scanning arrangement for scanning the outputs of all of said transducers in succession.

8. An arrangement as defined in claim 2 wherein said receiver comprises a single receiving device and means for continuously rotating said device.

References Cited

UNITED STATES PATENTS 2,557,869  6/1951  Gloess _____ 343—11
3,305,787  2/1967  Distler et al. _____ 343—118 X RICHARD A. FARLEY, *Primary Examiner.*

U.S. Cl. X.R.

340—6; 343—11, 118